United States Patent [19]

Richardson

[11] Patent Number: 4,577,788

[45] Date of Patent: Mar. 25, 1986

[54] PORTABLE MULTIPURPOSE DESK CONTAINER

[76] Inventor: Jennings R. Richardson, 49 S. Cholla, Gilbert, Ariz. 85234

[21] Appl. No.: 653,568

[22] Filed: Sep. 24, 1984

[51] Int. Cl.$^4$ ............................................. B60R 7/00
[52] U.S. Cl. ..................................... 224/273; 108/44; 224/311
[58] Field of Search ...................... 224/311, 275, 273; 296/37.12; 108/44, 45, 46; 224/42.43, 42.44, 901; 312/231

[56] References Cited

U.S. PATENT DOCUMENTS

| | | |
|---|---|---|
| 1,773,337 | 8/1930 | Barlow . |
| 1,822,973 | 9/1931 | Konzen . |
| 1,860,797 | 5/1932 | Zimmerman . |
| 2,167,731 | 8/1939 | Swanstrom . |
| 2,211,660 | 8/1940 | Kidd et al. ............................ 312/231 |
| 2,491,009 | 9/1949 | Lawrence . |
| 2,934,391 | 4/1960 | Bohnett .......................... 108/44 X |
| 3,164,109 | 1/1965 | Atkinson ............................ 108/44 |
| 3,338,629 | 8/1967 | Drees . |
| 3,394,666 | 7/1968 | Pearlman ......................... 108/44 X |
| 3,632,158 | 1/1972 | Boothe .............................. 108/44 X |
| 3,800,939 | 4/1974 | Cornelius ......................... 224/901 X |
| 3,873,010 | 3/1975 | Patterson . |
| 3,909,092 | 9/1975 | Kiernan . |
| 4,053,133 | 10/1977 | Kauffman ......................... 224/275 X |
| 4,234,112 | 11/1980 | Gallant ............................. 224/42.43 |
| 4,244,632 | 1/1981 | Molinari ............................ 312/231 |
| 4,453,788 | 6/1984 | Russell ............................. 224/273 X |

*Primary Examiner*—Stephen Marcus
*Assistant Examiner*—Robert Petrik
*Attorney, Agent, or Firm*—Harry M. Weiss & Associates

[57] ABSTRACT

A generally rectangular-shaped container which can be removably mounted on a vehicle dashboard is disclosed that has upper and lower lids. The lower lid fits onto the container and is preferably cemented to the container. The upper lid has tabular extensions at one of its ends which removably engage apertures in the container. The other end of the upper lid is held in place by an elongated angled extension attached to the lower lid. Quick attach-detach surfaces or magnetic surfaces may be used to hold the lids together if desired. The container has a plurality of compartments and drawers for holding objects. Adjustable support arms and a hinged member are used in conjunction with quick attach-detach surfaces in order to mount the container to the vehicle dashboard. After the container is removed from the dashboard, it can be mounted on any substantially flat surface using T-shaped members which are part of the support arms. The container can be used with a hinged upper lid if desired.

19 Claims, 8 Drawing Figures

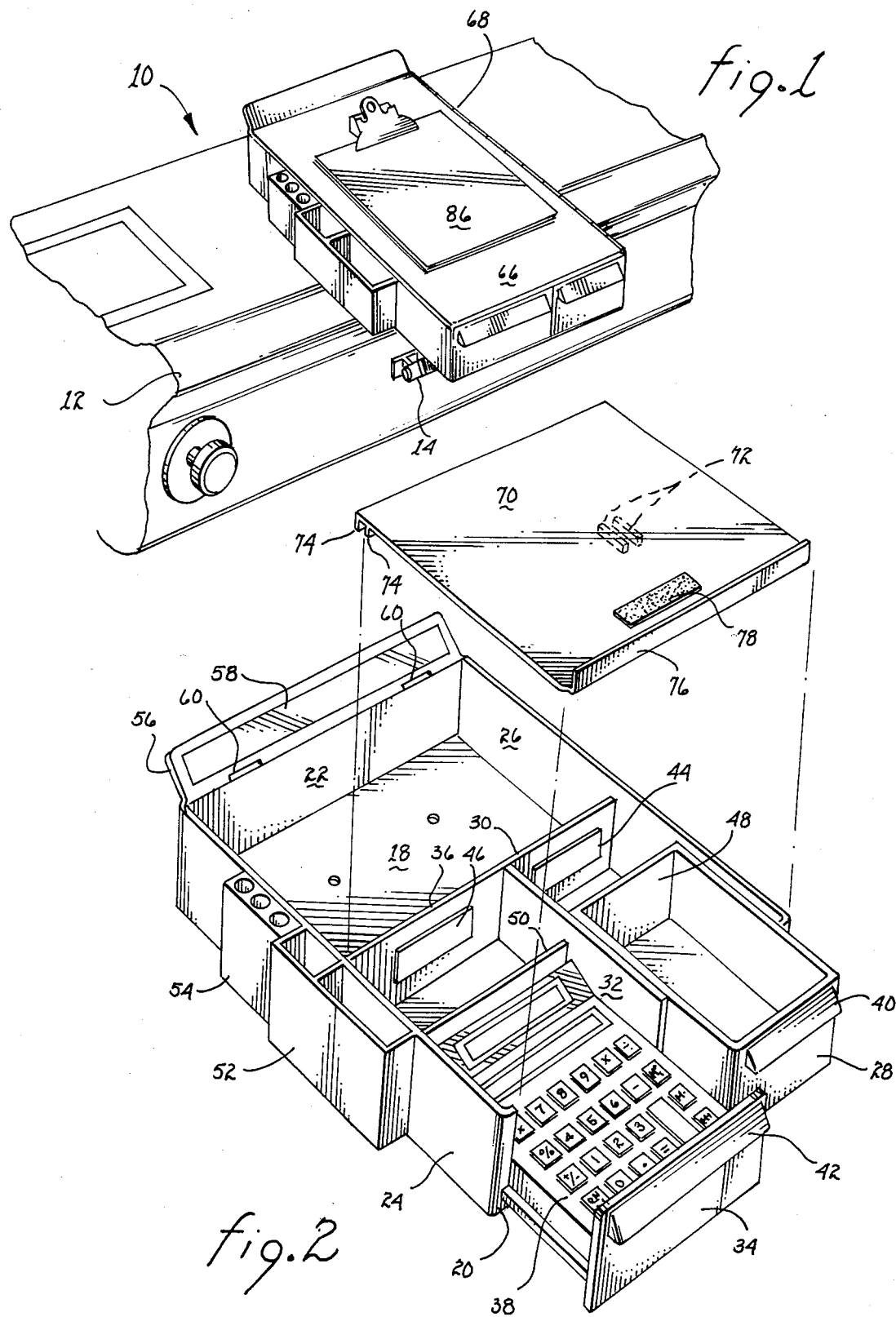

PORTABLE MULTIPURPOSE DESK CONTAINER

BACKGROUND OF THE INVENTION

This invention relates generally to containers which can be used to hold objects and, more particularly, to a portable multipurpose desk container which can be mounted on a vehicle dashboard or on any substantially flat surface and used as a desk or for holding a variety of objects.

Very often, the driver of an automobile or truck needs to store objects such as cigarettes, pencils, papers, calculators, etc. Unless there is some readily available container where these objects can be kept, they tend to slide or fall about when a vehicle is brought to a sudden stop. In addition, there is often a need for a flat surface such as the top of a container upon which a paper or document can be securely held in place while the vehicle is moving. This would allow a passenger to write on the document while the vehicle is being driven and the driver to do the same after the vehicle is stopped.

Moreover, there is a need for a portable container which may be used in a vehicle as described above and thereafter removed from the vehicle and used at a different location. For example, a person may remove the container from the vehicle and place it on top of a table top at his or her work area.

The inventor filed a patent application on May 9, 1984 entitled "Vehicle Desk Container," Ser. No. 608,399. However, the container described in this application is primarily intended to be used inside a vehicle.

Accordingly, there is a need for a portable multipurpose desk container which can be mounted on a vehicle dashboard and thereafter removed and used at a different location. The portable multipurpose desk container should have sufficient storage space to hold a variety of objects, one or more drawers for holding items such as a calculator and one or more lids that can be snapped shut. The container should be capable of being mounted on top of any substantially flat surface.

SUMMARY OF THE INVENTION

It is an object of this invention to provide an improved portable multipurpose desk container.

It is another object of this invention to provide an improved portable multipurpose desk container which can be used to hold a variety of useful objects. As such, sufficient storage space should be provided for such objects and one or more lids should be provided which will secure the objects within the container.

It is a further object of this invention to provide an improved portable multipurpose desk container with features such as drawers for holding various items such as a calculator.

It is still a further object of this invention to provide an improved portable multipurpose desk container which can be removably mounted on a dashboard and thereafter removed and used at a different location.

It is still a further object of this invention to provide an improved portable multipurpose desk container which is capable of being mounted on top of any substantially flat surface.

In accordance with one embodiment of this invention, a portable multipurpose desk container is disclosed comprising body means for holding a variety of objects; upper lid means operably and removably coupled to the body means for opening and closing the body means so that objects can be placed within and removed from the body means; lower lid means operably coupled to the body means for holding the upper lid means in place when the upper lid means is closed; and support means operably coupled to the body means for removably mounting the body means to a vehicle dashboard and for mounting the body means on a substantially flat surface after it is removed from the vehicle dashboard. In this embodiment, a generally rectangular-shaped container which can be removably mounted on a vehicle dashboard is disclosed that has upper and lower lids. The lower lid fits onto the container and is preferably cemented to the container. The upper lid has tabular extensions at one of its ends which removably engage apertures in the container. The other end of the upper lid is held in place by an elongated angled extension attached to the lower lid. Quick attach-detach surfaces or magnetic surfaces may be used to hold the lids together if desired. The container has a plurality of compartments and drawers for holding objects. Adjustable support arms and a hinged member are used in conjunction with quick attach-detach surfaces in order to mount the container to the vehicle dashboard. After the container is removed from the dashboard, it can be mounted on any substantially flat surface using T-shaped members which are part of the support arms.

In accordance with another embodiment of this invention, a hinged upper lid may be used instead of an upper lid with tabular extensions. In such a case the hinged upper lid would be pivotably coupled to one side of the container by a hinge.

The foregoing and other objects, features and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view showing a portable multipurpose desk container with a hinged upper lid mounted on a vehicle dashboard;

FIG. 2 is an exploded top perspective view of a portable multipurpose desk container having apertures for a tabbed upper lid showing a lower lid which fits onto the container;

DESCRIPTION OF THE PREFERRED EMBODIMENT

Figure 3:
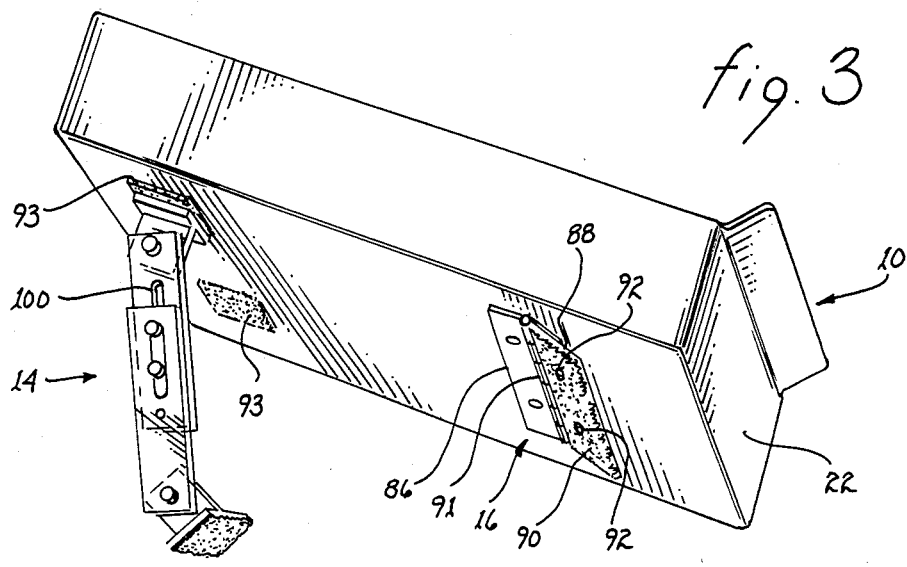
FIG. 3 is a bottom perspective view of the portable multipurpose desk container showing a support arm removable attached to the bottom of the container.

FIG. 1 shows a perspective view of a portable multipurpose desk container, generally designated by reference number 10, mounted on a vehicle dashboard 12. The desk container 10 is mounted on the dashboard by support arm 14 and a hinged member 16 (see FIG. 3).

FIG. 2 is an exploded top perspective view of one embodiment of the desk container 10. This embodiment consists of a box-shaped container 10 having a bottom 18, front end 20, rear end 22, left side 24, and right side 26. A drawer 28 is shown slidable engaging the desk container 10 through an aperture in the front end 20. Partitions 30 and 32 form a compartment inside the container 10 which encloses the drawer 28. Another drawer 34 also slidable engages the desk container 10 as shown in FIG. 2. Partitions 32 and 36 form a compartment for the drawer 34. Drawer 34 is shown holding a calculator 38. It is important to note that the container 10 may be fabricated with a number of other compartments (not shown) which may be used to hold various other objects. Also, items other than a calculator 38 may be placed in drawer 34. Objects such as paper clips, erasers, and the like may be kept in drawers 28 and 34 if desired. In an alternative embodiment (not shown), the partitions 30, 32 and 36 may be used to contain objects without drawers 28 and 34. In such a case, the front end 20 would not have apertures for the drawers 28 and 34. Drawers 28 and 34 may be kept shut by a latch or other locking devices (not shown) if desired. Preferably, the drawers 28 and 34 have handles 40 and 42, respectively, as shown in FIG. 2. However, other types of handles may be used if desired.

Quick attach-detach surfaces 44 and 46 are shown attached to the partitions 30 and 36, respectively. Corresponding quick attach-detach surfaces (not shown) are attached to the rear ends 48 and 50 of the drawers 28 and 34, respectively. As such, when the drawers 28 and 34 are shut, the quick attach-detach surfaces operably stick together helping to keep the drawers 28 and 34 shut. It is important to note that the drawers 28 and 34 may be used without quick attach-detach surfaces if desired. Also, magnetic surfaces, or the like may be substituted in place of the quick attach-detach surfaces if desired.

The desk container 10 shown in FIG. 2 has other useful features. Mounted on the left side 24 of the desk container 10 are side compartments 52 and 54 for holding items such as cigarettes, a cigarette lighter, pens, pencils, or the like. Only two side compartments 52 and 54 are shown in FIG. 2. However, any number of side compartments can be mounted on either side 24 or side 26 of the desk container 10. Compartments (not shown) may be attached to the rear end 22 of the container 10 if desired.

The rear end 22 of the container 10 has an upper extension 56 attached to its rear end 22. The upper extension 56 preferably has an area 58 which may be used to display the name of a person or for any other useful purpose. Passing through the container 10 approximately at the bottom of the upper extension 56 are apertures 60. A tabbed upper lid 62 (see FIG. 8) has tabular extensions 64 which slidably engage the apertures 60 when the upper lid 62 is fitted into place. Note that a hinged lid 66 with hinges 68 as shown in FIG. 1 may be used in place of the tabbed upper lid 62 if desired. If a hinged lid 66 is used, it would be pivotably coupled to the container 10 by hinges 68 attached to either side 24 or side 26 of the container 10.

Figure 6:
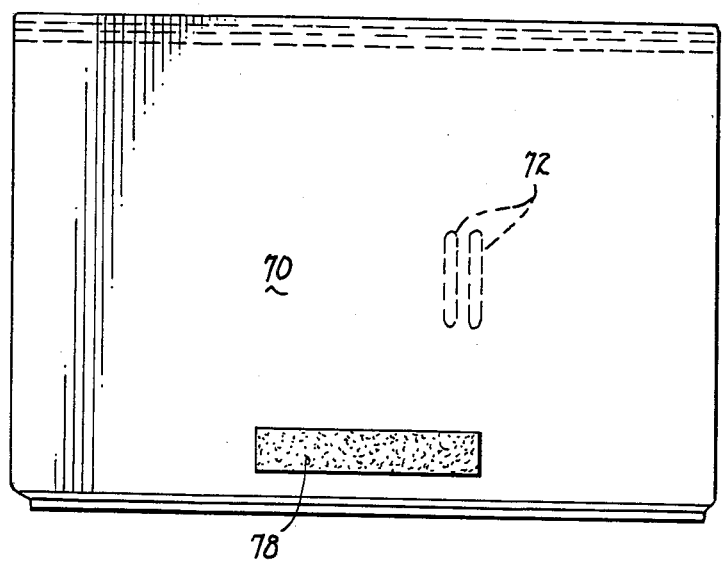
FIG. 6 is a top plan view of the lower lid.
Figure 7:
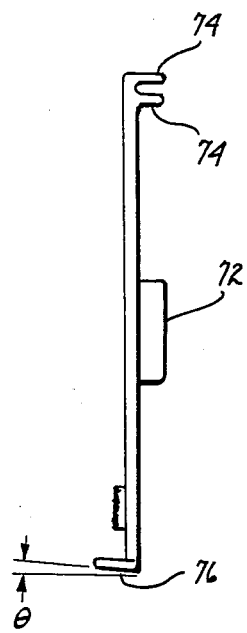
FIG. 7 is an end view of the lower lid.
Figure 8:
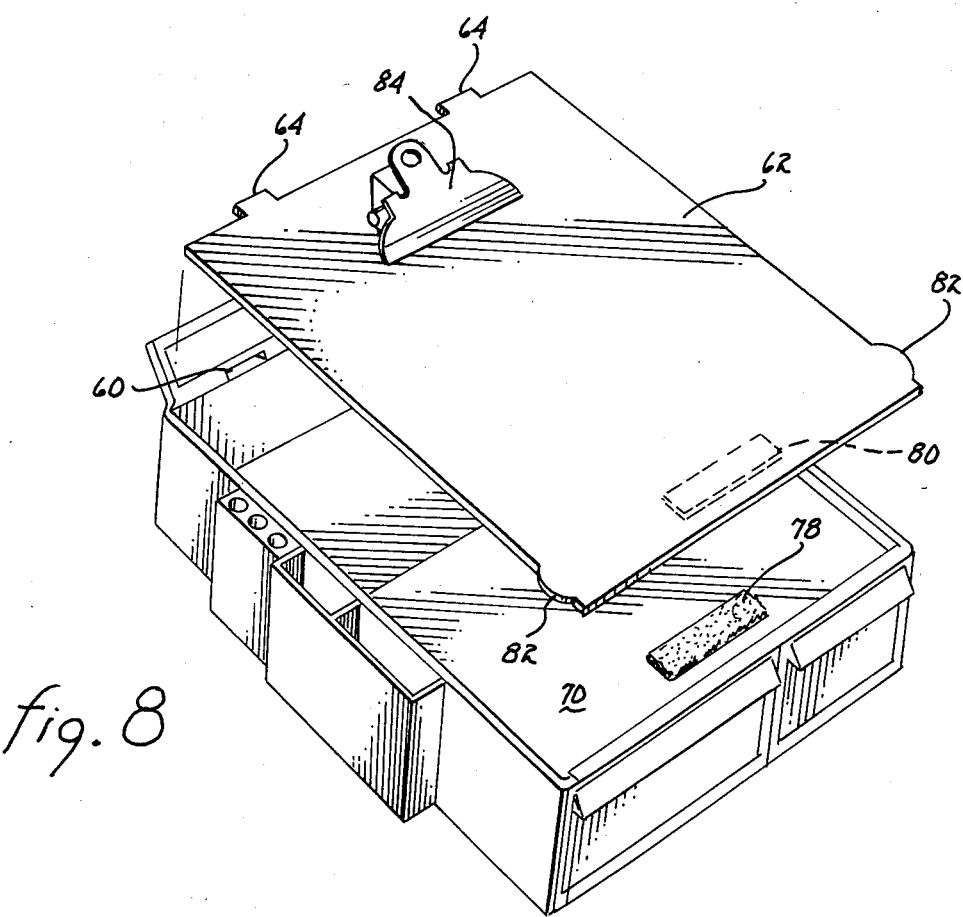
FIG. 8 is an exploded top perspective view of the portable multipurpose desk container showing the lower lid in place and the tabbed upper lid which fits on top of the container.

FIGS. 2, 6 and 8 show a lower lid 70 which is fitted onto the container 10. The lower lid 70 has a channeled groove formed by elongated extensions 74 at one end which operably engage particians 30 and 36 of the container 10 and extensions 72 which operably engage partician 32 when the lid 70 is fitted into place. The lower lid 70 is preferably cemented to the container 10. However, the lower lid 70 may be used without cement if desired. Attached to the other end of the lower lid 70 is an elongated angled extension 76 which extends in an upward direction. The elongated angled extension 76 forms an angle $\theta$ of preferably five degrees with a vertical plane perpendicular to the lower lid 70. However, this angle $\theta$ may vary as needed. The elongated angled extension 76 operably engages one end of the upper lid 62 when it is fitted in place on top of the container 10. Note that the lower lid 70 has a quick attach-detach surface 78 attached to its top side which operably engages a quick attach-detach surface 80 attached to the bottom side of the upper lid 62. As a result, the surfaces 78 and 80 help to hold the upper lid 62 in place. The upper and lower lids 62 and 70 may be used without quick attach-detach surfaces if desired. As mentioned above, magnetic surfaces, or the like may be used instead of the quick attach-detach surfaces if desired.

Referring to FIGS. 1 and 8, the container 10 has a clip 84 attached to the upper lid 62 which allows papers 86 to be clipped to the top of the lid 62. As a result, the top of lid 62 provides a flat surface for a passenger to write on while a vehicle is moving.

The container 10 may be used as follows. After objects are placed in the container 10, the upper lid 62 is fitted in place by first inserting the tabular extensions 64 at one end of the lid 62 into the apertures 60 and then snapping the other end of the lid 62 shut using the elongated angled extension 76. The upper lid may be removed by grasping extensions 82 shown in FIG. 8 and pulling the lid 62 free from the elongated angled extension 76.

FIG. 3 is a bottom perspective view of the container 10. A hinged member 16 is attached to the bottom of the container 10 near the rear end 22. The hinged member 16 has a first portion 86 attached to the bottom of the container 10 and a second portion 88 pivotably coupled to the first portion 86 by a hinge 91. The hinged member 16 has a quick attach-detach surface 90 fastened to the second portion 88. Note that the second portion 88 has apertures 92 passing through it. Quick attach-detach surfaces 93 are fastened to the bottom of the container 10 near the front end 20. A support arm 14 is shown removably attached to the bottom of the container 10 using one of the quick attach-detach surfaces 93. More than one support arm 14 may be used if desired.

Figure 5:
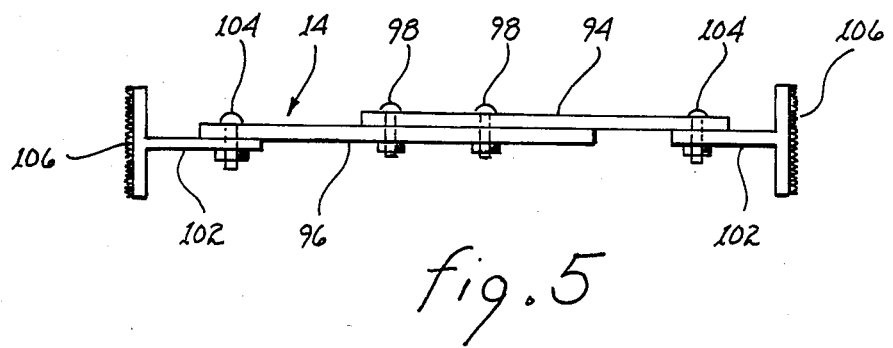
FIG. 5 is a top view of one of the support arms.

A top view of the support arm 14 is shown in FIG. 5. The support arm 14 has two elongated members 94 and 96 operably coupled together by fastening devices 98 (preferably bolts and nuts). As shown in FIG. 3, one of the elongated members has an elongated slot 100 through it which allows the length of the support arm 14 to be varied. This is accomplished by loosening the fastening devices 98, adjusting the length of the support arm 14 using the slot 100 and then tightening the fastening devices 98. A T-shaped member 102 is removably attached to each end of the support arm 14 by fastening devices 104 (preferably bolts and nuts). Note that the T-shaped members 102 may be rotated with respect to the elongated members 94 and 96 by loosening the fastening devices 104. Each T-shaped member 102 has a quick attach-detach surface 106 fastened to it as shown in FIG. 5.

As shown in FIG. 3, the support arm 14 is removably attached to the bottom of the container 10 by means of the quick attach-detach surfaces 93 and 106. Also note that the configuration of the support arm 14 may be changed by loosening the fastening devices 104 and rotating the T-shaped members 102. The container 10 may be mounted on the dashboard 12 of a vehicle as shown in FIG. 1 by first attaching the quick attach-detach surface 90 fastened to the hinged member 16 to another quick attach-detach surface (not shown) fixed to the dashboard 12. At least one support arm 14 is then attached to the other end of the container 10 by the quick attach-detach surfaces 93 and 106 and then secured to another support in the vehicle by means of the quick attach-detach surface 106 fastened to one of the T-shaped members 102. A corresponding quick attach-detach surface (not shown) is fastened to the vehicle support. Note that more than one support arm 14 may be used if desired.

Figure 4:
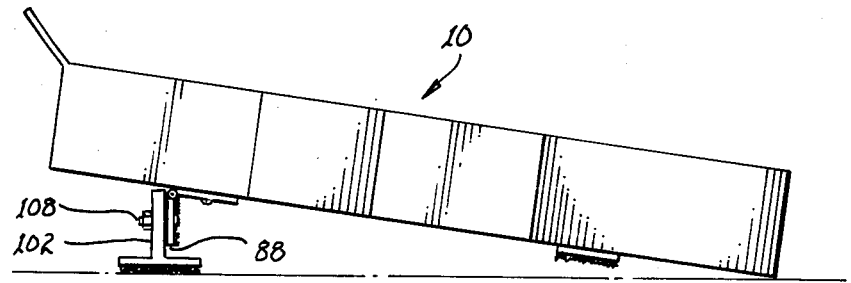
FIG. 4 is a side view of the portable multipurpose desk container showing how T-shaped members may be removable attached to a hinged member in order to support the container on a substantially flat surface.

The multipurpose desk container 10 may be removed from the dashboard 12 and mounted on a relatively flat surfaces such as a table top as shown in FIG. 4. This is accomplished by removing at least one of the T-shaped members 102 from the support arm 14 and then using a fastening device 108 to secure the T-shaped member 102 to the second portion 88 of the hinged member 16 as shown in FIG. 4. As such, the T-shaped member 102 furnishes vertical support for the container 10, allowing it to be mounted on top of a substantially flat surface and slanted as shown in FIG. 4 so that a person can easily write on papers 86 clipped to the top of the upper lid 62.

While the invention has been particularly shown and described in reference to preferred embodiments thereof, it will be understood by those skilled in the art that various modifications and changes in form and detail may be made therein without departing from the spirit and scope of the invention.

I claim:

1. A portable multipurpose desk container, comprising:
    a body means having at least one side compartment integral thereto for holding a variety of objects, said compartment having at least one enclosure extending along the height of said side of said compartment;
    an upper lid means operably and removably coupled to said body means for opening and closing said body means so that objects can be placed within and removed from said body means;
    a lower lid means operably coupled to said body means for holding said upper lid means in place when said upper lid means is closed; and
    a support means operably coupled to said body means for removably mounting said body means to a vehicle dashboard and for mounting said body means on a substantially flat surface after said body means is removed from said vehicle dashboard, said support means comprising (a) a hinged member coupled to the bottom portion of said body means for supporting one end of said body means while said body means is mounted to said vehicle dashboard, said hinged member has apertures passing therethrough and a quick attach-detach surface fastened thereto for operably and removably coupling said quick attach-detach surface to a corresponding quick attach-detach surface fastened to said vehicle dashboard; and (b) at least one support arm operably and removably coupled to the bottom portion of said body means for supporting the other end of said body means while said body means is mounted to said vehicle dashboard, said support arm suitable for being bendable at a plurality of portions therethroughout said support arm.

2. The portable multipurpose desk container of claim 1, wherein said body means comprises a generally rectangular-shaped container having a bottom, a front end, a rear end and two sides.

3. The portable multipurpose desk container of claim 2, wherein said generally rectangular-shaped container has a plurality of partitions forming at least one internal compartment within said container.

4. The portable multipurpose desk container of claim 3, wherein said front end has at least one aperture through it, said generally rectangular-shaped container has at least one drawer, each of said at least one drawer slidably engages one of said at least one aperture.

5. The portable multipurpose desk container of claim 4, wherein said generally rectangular-shaped container has an upper extension attached to the top of said rear end, said upper extension has apertures passing through it.

6. The portable multipurpose desk container of claim 5, wherein said lower lid means comprises a generally rectangularshaped sheet, said sheet of said lower lid means has elongated extensions at one of its ends and extensions attached to its bottom surface for operably engaging said partitions located within said generally rectangular-shaped container, said sheet of said lower lid means has an elongated angled extension at its other end, said elongated angled extension forms an acute angle with a vertical plane perpendicular to said sheet.

7. The portable multipurpose desk container of claim 6, wherein said upper lid means comprises a generally rectangularshaped sheet, said sheet of said upper lid means has tabular extensions at one of its ends and grasping extensions near its other end, said tabular extensions operably and removably engage said apertures in said upper extension and said other end of said sheet of said upper lid means operably and removably engages said elongated angled extension when said upper lid means is operably and removably coupled to said body means.

8. The portable multipurpose desk container of claim 7, wherein said support arm means comprises at least one support arm, each support arm includes:
    two elongated members operably and slidably coupled to each other by fastening devices, one of said elongated members has an elongated slot through it so that the overall length of said elongated members when coupled together can be varied by loosening said fastening devices, adjusting said overall length and then tightening said fastening devices; and
    two T-shaped members, one of said T-shaped members being operably, rotatably and removably coupled to one of said elongated members and the other of said T-shaped members being operably, rotatably and removably coupled to the other of said elongated members, each of said T-shaped members has a quick attach-detach surface fastened to it for operably and removably coupling one end of said support arm to said body means and the other end of said support arm to a supporting structure in a vehicle.

9. The portable multipurpose desk container of claim 8, wherein said bottom of said generally rectangular-shaped container has a plurality of quick attach-detach surfaces fastened to it.

10. The portable multipurpose desk container of claim 9, wherein said support means, comprises:
- a hinged member coupled to said bottom of said generally rectangular-shaped container for supporting one end of said container while it is mounted to said vehicle dashboard, said hinged member has apertures through it and a quick attachdetach surface fastened to it for operably and removably coupling said quick attach-detach surface to a corresponding quick attachdetach surface fastened to said vehicle dashboard; and
- support arm means operably and removably coupled to said bottom of said generally rectangular-shaped container for supporting the other end of said container while it is mounted to said vehicle dashboard.

11. The portable multipurpose desk container of claim 10, wherein said support arm means comprises at least one support arm, each support arm includes:
- two elongated members operably and slidably coupled to each other by fastening devices, one of said elongated members has an elongated slot through it so that the overall length of said elongated members when coupled together can be varied by loosening said fastening devices, adjusting said overall length and then tightening said fastening devices; and
- two T-shaped members, one of said T-sahped members being operably, rotatably and removably coupled to one of said elongated members and the other of said T-shaped members being operably, rotatably and removably coupled to the other of said elongated members, each of said T-shaped members has a quick attach-detach surface fastened to it for operably and removably coupling one end of said support arm to one of said quick attach-detach surfaces fastened to said bottom of said generally rectangular-shaped container and the other end of said support arm to a quick attachdetach surface fastened to a supporting structure in a vehicle.

12. The portable multipurpose desk container of claim 11, wherein said lower lid is cemented to said generally rectangular-shaped container and said acute angle of said elongated angled extension is about five degrees.

13. The portable multipurpose desk container of claim 12 wherein said upper lid has a spring clip attached to its top surface.

14. The portable multipurpose desk container of claim 13, wherein said upper extension of said generally rectangular-shaped container has a surface for attaching a name plate and other indicia.

15. The portable multipurpose desk container of claim 14, wherein said partitions and said at least one drawer of said generally rectangular-shaped container have quick attach-detach surfaces fastened to them so that each of said at least one drawer can be kept shut.

16. The portable multipurpose desk container of claim 15, wherein said lower lid has a quick attach-detach surface fastened to its top surface and said upper lid has a quick attach-detach surface fastened to its bottom surface in order to assist in holding said lids together.

17. The portable multipurpose desk container of claim 16, wherein said quick attach-detach surfaces comprise VELCRO surfaces.

18. The portable multipurpose desk container of claim 14, wherein said partitions and said at least one drawer of said generally rectangular-shaped container have magnetic surfaces fastened to them so that each of said at least one drawer can be kept shut.

19. The portable multipurpose desk container of claim 18, wherein said lower lid has a magnetic surface fastened to its bottom surface in order to assist in holding said lids together.

* * * * *